United States Patent [19]

Warren

[11] Patent Number: 4,566,151
[45] Date of Patent: Jan. 28, 1986

[54] POULTRY DEFEATHERING APPARATUS AND PROCESS

[76] Inventor: Sanford E. Warren, 531 Mill St., Morton, Miss. 39117

[21] Appl. No.: 532,310

[22] Filed: Sep. 15, 1983

[51] Int. Cl.⁴ ............................................. A22C 21/04
[52] U.S. Cl. ........................................... 17/47; 17/11.2
[58] Field of Search ............................ 17/11.2, 47, 51; 134/107, 111; 165/DIG. 2

[56] References Cited

U.S. PATENT DOCUMENTS

| | | |
|---|---|---|
| 2,994,909 | 8/1961 | Ray . |
| 3,094,740 | 6/1963 | Reeves . |
| 3,631,563 | 1/1972 | Snowden . |
| 3,657,768 | 4/1972 | Snowden . |
| 3,694,856 | 10/1972 | Kaufman et al. . |
| 3,744,088 | 7/1973 | Snowden . |
| 3,748,691 | 7/1973 | Snowden . |
| 3,797,068 | 3/1974 | Dillon . |
| 4,401,261 | 8/1983 | Brown ...................... 165/DIG. 2 X |

*Primary Examiner*—Willie G. Abercrombie
*Attorney, Agent, or Firm*—Banner, Birch, McKie & Beckett

[57] ABSTRACT

The present invention comprises a poultry defeathering apparatus for use with boilers having boiler stacks. The apparatus comprises a heat exchanger which is located proximate to the boiler stacks for exchanging heat energy contained within the boiler stacks to heated air to be used in the defeathering apparatus. A hot air mixer in communication with the heat exchanger receives the heated air and cools it with ambient air to reduce the heat energy to an appropriate level. A blower in fluid communication with the mixer receives the heated air and increases its volumetric flow rate. A scalding tank is included for scalding fowl carcasses drawn through the water within the tank. The tank also includes a hot air divider positioned near the bottom of the tank and extending longitudinally along a subtantial portion of the bottom, the divider being in fluid communication with the blower to receive the heated air from the blower. The divider also includes nozzles through which the heated air is injected into the scalding water to further heat and agitate the water.

5 Claims, 2 Drawing Figures

POULTRY DEFEATHERING APPARATUS AND PROCESS

TECHNICAL FIELD

The present invention broadly relates to fowl defeathering processes, and more particularly, to the use of boiler stack heated air to heat and agitate water used to defeather poultry and particularly chickens.

BACKGROUND OF THE INVENTION

It is well known in the art of chicken defeathering to apply water or steam to the poultry carcass as it is dragged through a treatment chamber. Typically in the past, high pressure steam is used to scald the poultry to improve the defeathering process. Another standard process by which poultry is defeathered is to tow the carcass through a tank of scalding water which is agitated by some sort of mechanical means. Commonly, outboard motors of the type used to drive boats are placed in the scalding tanks to agitate the water so that it better permeates the feathers and improves the efficiency of the defeathering process.

Reeves, U.S. Pat. No. 3,094,740, discloses a poultry scalding tank in which ambient air is past through the water within the tank to agitate it. The air is unheated and is used simply to agitate the water. Ray U.S. Pat. No. 2,994,909 discloses a poultry scalder in which compressed ambient air is discharged through baffles located on the side of a scalding tank and blows to the top of the tank. Likewise, the air is unheated and is simply used to acetate the water. This configuration aerates the water from the bottom of the tank creating a waterfall effect on the top. Poultry which is floating along on top of the water is forced below the surface by this waterfall action.

The defeathering processes used in the past, especially those that use mechanical agitating means, have unnecessarily used two sources of energy to heat the scalding tank water and to agitate it. While some processes combine steam heating and ambient air agitation (e.g., Reeves and Ray), these systems necessarily require excessive energy for both heating and agitation. In addition, these systems cannot be retrofitted to existing scalding tank structures. As a result, there exists no suitable poultry defeathering process and apparatus that is energy efficient yet capable of being used with currently utilized equipment.

SUMMARY OF THE INVENTION

An object of the present invention is to provide a fowl defeathering apparatus and process which is highly energy efficient.

A further object of the present invention is to provide a fowl defeathering process and apparatus which utilizes boiler stack heated air.

A still further object of the present invention is to utilize hot air from the boiler stack both to heat a tank of water to the required scalding temperature and to provide the required agitation for increase defeathering effeciency.

The present invention comprises a poultry defeathering apparatus for use with boilers having boiler stacks. The apparatus comprises a heat exchanger which is located proximate to the boiler stacks for exchanging heat energy contained within the boiler stacks to heated air to be used in the defeathering apparatus. A hot air mixer in communication with the heat exchanger receives the heated air and cools it with ambient air to reduce the heat energy to an appropriate level. A blower in fluid communication with the mixer receives the heated air and increases its volumetric flow rate. A scalding tank is included for scalding fowl carcasses drawn through the water within the tank. The tank also includes a hot air divider positioned near the bottom of the tank and extending longitudinally along a substantial portion of the bottom, the divider being in fluid communication with the blower to receive the heated air from the blower. The divider also includes nozzles through which the heated air is injected into the scalding water to further heat and agitate the water.

The invention also includes an improved process for defeathering fowl in which air is passed through the heat exchanger located proximate to the boiler stack to heat the air. The heated air is then mixed in a hot air mixer in fluid communication with the heat exchanger to reduce the heat energy of the heated air to the appropriate level. The volumetric flow rate of the heated air is then increased. Finally, the heated air is discharged into the scalding water from air dividers to further heat and to agitate the water while the poultry carcasses are towed therethrough.

DETAILED DESCRIPTION OF THE INVENTION

Figure 1:
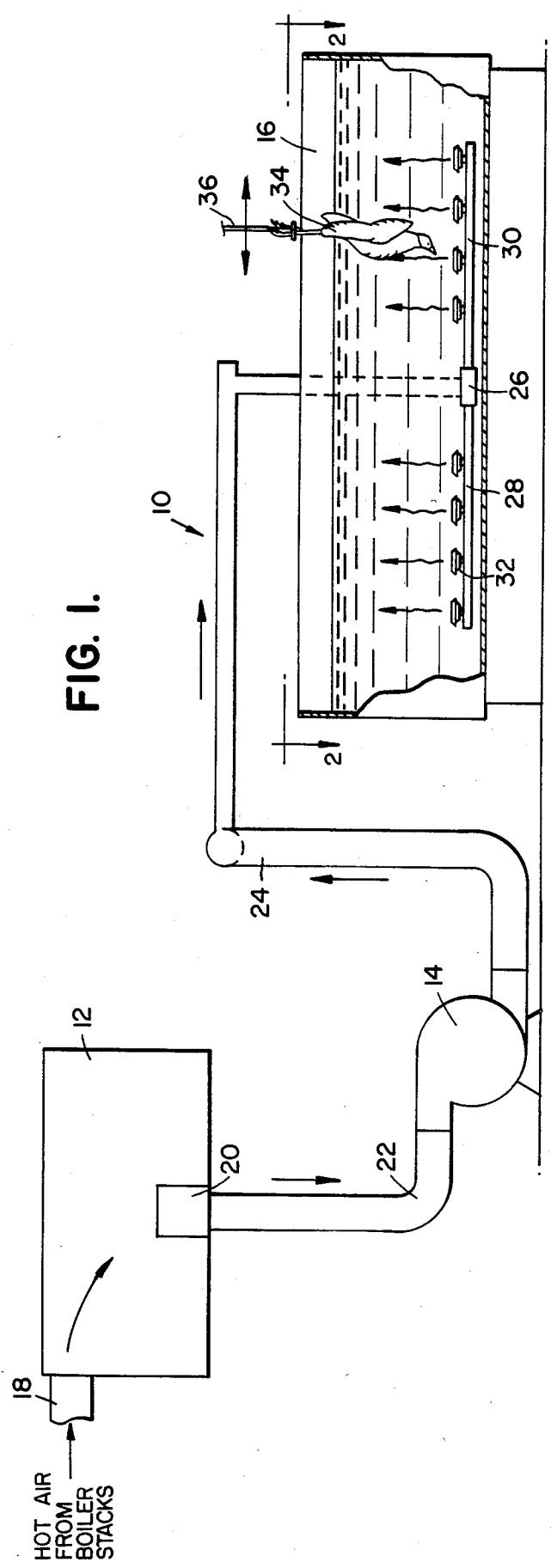
FIG. 1 is a schematic view of the process and apparatus of the present invention.

Shown in FIG. 1 is a process for defeathering poultry indicated generally at 10. The apparatus and process comprise a hot air mixing reservoir 12, a blower 14, and a scalding tank 16. Broadly stated, the process and apparatus utilize air which is heated from the flue gasses emanating from the boiler stacks; the heated air then enters reservoir 12, as indicated by arrows in FIG. 1. The heated air from reservoir 12 is supplied to blower 14 and then follows the path indicated by the arrows in FIG. 1 to air dividers 26 where it is eventually discharged into scalding tank 16 to agitate and further heat the water contained therein.

Figure 2:
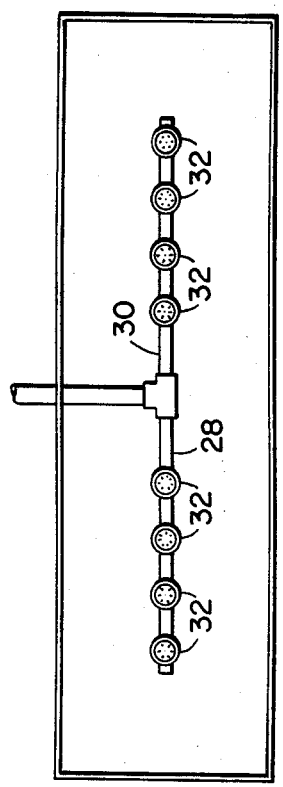
FIG. 2 is a top plan view of the scalding tank as indicated by lines 2—2 in FIG. 1.

Referring to FIGS. 1 and 2 in detail, the present invention involves a chicken defeathering process in which boilers having boiler stacks are used to heat the water that is collected in tank 16 to which poultry carcasses 34 are drawn by tow line 36 for defeathering. As indicated in FIG. 1, hot air is passed through heat exchanger located adjacent to the boiler stacks attached to the boilers used in the process (not shown). As a result of this step, energy that might otherwise be wasted is used, replacing the natural gas or other fuel source normally used. The air is sent from the boiler stacks to the hot air mixing reservoir 12, which is in fluid communication with the heat exchanger located adjacent to the boiler stacks through conduit 18. Preferably, the heat exiting the heat exchanger is heated to a temperature of between 280° and 320° F. The air enters mixing reservoir 12 and is mixed therein with ambient air by means of an adjustable hatch or vent. The hatch (not shown), can be any suitable opening device in which the amount of atmosphere air entering reservoir 12 can be controlled. After the hot air within reservoir 12 reaches an appropriate temperature, preferably 140° F., the hot air is drawn into filter 20 located at the bottom of reservoir 12 and is transmitted through blower conduit 22 to blower 14.

Blower 14 is a high volume-low pressure blower for passing the air at a high volumetric flow rate from conduit 22 to tank conduit 24. For example, a blow rate of 720 cubic feet per minute at 3 p.s.i.g. can be utilized. Model No. 8MV-B Sulorbilt series blower manufactured by Fuller Co. is appropriate for this purpose. Blowers of this type have friction drives which not only increase the volumetric rate of air but also increase its temperature. Preferably, the air is heated 40° F. as it passes through blower 14. After the air has exited blower 14 it enters tank conduit 24 and travels in the direction indicated by the arrows to air dividers 26 located at the bottom of tank 16.

As seen in FIGS. 1 and 2, air dividers 26 comprises two pipes 28 and 30 longitudinally extending along the bottom of tank 16. Located on the upper portion of pipes 28, 30 are a plurality of nozzles 32 in fluid communication with air dividers 26. As indicated in FIG. 1, air which has exited blower 14 travels through tank conduit 24 to air dividers 26 and it is then injected from the bottom of the tank upwardly into the water as shown by the arrows in FIG. 1. The movement of the heated air through the water further heats the water and additionally agitates it so that it better penetrates the feathers of the fowl carcass. Typically, the water in the tank should be between 126° and 130° F. in order that an initial carcass temperature of 105° F. be raised to the required level to effectively remove the feathers.

Tank 16 initially is heated to the desired temperature by the use of steam, as in the prior art system. The subsequent use of steam energy is substantially decreased by the discharge hot air passing through the tank. In fact, the use of hot air reduces the need for steam heat by thirty percent, reducing the energy required for the process.

In addition, the energy required for the process is reduced further, because the hot air added to the tank agitates the water. This agitation greatly reduces the need for any mechanical agitation devices. Thus, the instant invention reduces the amount of energy needed to operate mechanical agitators as well as the number of required mechanical parts, reducing the cost and instances of mechanical breakdowns.

In actual operation, carcass 34 is typically drawn through the water four times in order to achieve the required carcass temperature level. Air discharged through nozzles 32 passes upwardly through the water to further heat the water and agitate it so that the feathers come off quickly and easily while minimizing energy loss. In this manner, poultry carcasses are defeathered so they receive further treatment in the meat treatment process.

While the invention has been patentably shown and described with reference to a preferred embodiment thereof, it will be understood by those skilled in the art that various changes in form and details may be made therein without departing from the spirit and scope of the invention. For example, air reservoir 12 could be adjusted to produce hot air at approximately 180° F. without further heating by an air pump which incorporates a heating feature, as described above.

I claim:

1. Poultry defeathering apparatus for defeathering fowl in a body of water heated by boiler-generated steam, comprising:
    a heat exchange means coupled to said boiler for heating a supply of air by transferring to said air supply a predetermined quantity of heat from the flue gasses emanating from the boiler;
    hot air mixing means in fluid communication with said heat exchange means for receiving heated air from said heat exchange means, and vent means for introducing ambient air into said hot air mixing means in order to cool said heated air to reduce its heat energy to an appropriate level;
    a water filled scalding tank for scalding fowl carcasses drawn through said tank;
    a blower means in fluid communication with said hot air mixing means for receiving heated air from said mixing means, increasing the volumetric rate of flow of said heated air and increasing the temperature of the heated air received from said mixing means; and
    hot air dividing means in fluid communication with said blower means for receiving heated air from said blower means said dividing means located at a level below fowl in said scalding tank and coupled to said heat exchange means for injecting said heated air into said water to further heat and to agitate said water and said fowl.

2. The poultry defeathering apparatus of claim 1 further comprises:
    said air dividing means including a plurality apertures through which heated air is injected.

3. A poultry defeathering apparatus in accordance with claim 1 wherein the air exiting said stacks has a temperature between 280° to 320° F.,
    the air exiting said mixing means has an approximate temperature of 140° F., and the air
    exiting said blower means has an approximate temperature of 180° F.

4. The chicken defeathering apparatus of claim 1 wherein said hot air mixing means comprises a structure having an interior defined by at least one side portion, an upper portion, and a bottom portion, one of said portions having an adjustable venting means for permitting said interior to be in fluid communication with variable amounts of ambient air by allowing ambient air to enter said structure and mix with said heated air; and
    said air dividing means comprises an elongated tube extending along the bottom of said body of water, said tube including a plurality of spaced nozzles, in fluid communication with said tube, and attached to the side of said tube facing said fowl.

5. An improved process for defeathering fowl in a body of water heated by boiler-generated steam, comprising the steps of:
    heating a supply of air by transferring to said air supply a predetermined quantity of heat from the flue gasses emanating from said boiler;
    mixing the heated air with ambient air to reduce the temperature of the heated air to an appropriate level;
    increasing the volumetric flow rate of the heated air;
    increasing the temperature of the heated air; and
    injecting said heated air into said body of water at a level below the fowl in said water to agitate and further heat said water and said fowl.

* * * * *